(12) United States Patent
Hou

(10) Patent No.: US 6,850,223 B2
(45) Date of Patent: Feb. 1, 2005

(54) KEY MECHANISM FOR AN INPUT DEVICE

(75) Inventor: Ding-Teng Hou, Xi-Zhi (TW)

(73) Assignee: Kye Systems Corp. (TW)

( * ) Notice: Subject to any disclaimer, the term of this patent is extended or adjusted under 35 U.S.C. 154(b) by 286 days.

(21) Appl. No.: 09/839,313

(22) Filed: Apr. 20, 2001

(65) Prior Publication Data
US 2002/0135559 A1 Sep. 26, 2002

(30) Foreign Application Priority Data
Mar. 22, 2001 (TW) .................................. 90204324 U

(51) Int. Cl.[7] .............................................. G09G 5/08
(52) U.S. Cl. ...................... 345/163; 345/156; 345/157; 345/168; 200/342
(58) Field of Search ................. 345/156–172; 341/20–22, 33; 340/825; 200/5 A, 5 R, 341–342, 344–345, 573; 400/474–491, 495–496

(56) References Cited

U.S. PATENT DOCUMENTS

| | | | | | |
|---|---|---|---|---|---|
| 5,267,407 A | * | 12/1993 | Bornancini | ................ | 42/70.08 |
| 5,350,244 A | * | 9/1994 | Buttner | ....................... | 400/496 |
| 5,519,570 A | * | 5/1996 | Chung | ........................ | 361/680 |
| 6,326,949 B1 | * | 12/2001 | Merminod et al. | ......... | 345/163 |
| 6,333,734 B1 | * | 12/2001 | Rein | .......................... | 345/169 |
| 6,369,797 B1 | * | 4/2002 | Maynard, Jr. | ............... | 345/163 |
| 6,376,789 B2 | * | 4/2002 | Maruyama et al. | ......... | 200/344 |
| 2003/0025673 A1 | * | 2/2003 | Ledbetter et al. | ........... | 345/163 |

* cited by examiner

Primary Examiner—Vijay Shankar
Assistant Examiner—Leonid Shapiro
(74) Attorney, Agent, or Firm—Raymond Sun

(57) ABSTRACT

A key mechanism for an input device includes a key having an axle that is coupled to a guide in the housing of the input device in a manner such that the key pivots about the axle when the key is depressed, while allowing the axle to simultaneously move up or down within the guide.

4 Claims, 4 Drawing Sheets

KEY MECHANISM FOR AN INPUT DEVICE

BACKGROUND OF THE INVENTION

1. Field of the Invention

The present invention relates to a key mechanism, and in particular, to a key mechanism fitted in a computer input device. The key has an adjustable suspended axle positioned on the input device in a manner so that it can be pivoted and moved linearly.

2. Description of the Prior Art

Nowadays, the computer mouse has become almost a standard peripheral device that is equipped with every computer system. Besides functioning to move the cursor on the screen, the computer mouse also performs a very important and extremely useful function in ticking icons on the screen. Therefore, it is desirable to upgrade the key mechanism of a computer mouse to provide (1) a better feel of touch, (2) a stable depressing motion, and (3) a key mechanism that occupies less space within the housing of the mouse.

FIG. 1 illustrates a prior art key mechanism structure for a computer mouse 9. The computer mouse 9 has an upper housing 91 and a lower housing 92 that together house several conventional micro switches and other conventional mouse components 94, such as a PC board, a ball, etc. The computer mouse 9 has several keys 95, with each key 95 having a protrusion 951 extending down through the upper housing 91 and contacting a micro switch 96. A fixed-arm mechanism is used to provide a positioning and depressing function for the keys 95. According to this fixed-arm mechanism, each key 95 has an extending arm 952 having a located opening 953. The extending arm 952 extends into the interior of the computer mouse 9 and is coupled to a positioning pillar 911 of the upper housing 91. The extending arm 952 is also supported by a hook 912 extending down from the upper housing 91. Thus, the hook 912 acts as a fulcrum while the key 95 is depressed so as to function like a fixed-arm structure. When a key 95 is depressed by a user, the key 95 will downwardly curve the extending arm 952 to activate the micro switch 96, which not only provides a rebounding force, but also relocates the keys 95 and its deformed extending arm 952.

In order to provide better feel of the touch on each key 95, and to upgrade the stability of the depressing motion on the key 95 (i.e., to achieve the accurate rebounding of the micro switch 96 when the key 95 is depressed), the extending arm 952 should be as long as possible such that the user will not feel the differences of the rebounding of the key 95 when the user applies force on any part of the key 95. However, the recent trend has seen the sizes of various computer input devices (including for computer mice) become smaller. In addition, add-on equipments and peripherals have become more and more popular, such as data gathering devices and storing devices, finger print identification devices, smart card reading devices, and memory card/memory stick reading devices. Therefore, given the size restrictions of computer input devices, it will be difficult to fit these devices inside the computer input device. To overcome this disadvantage, one possible solution is to keep the extending arm 952 short, but the user will need to endure a less-than-optimum feel when touching (i.e., depressing) the key 95, and the user may need to exert a greater force if the depressed portion of the key 95 is close to the hook 912. A second possible solution is to thin the thickness of the extending arm 952 near the hook 912, but this may lead to deformation of the extending arm 952 during molding or after extended use by the user.

SUMMARY OF THE DISCLOSURE

It is an object of the present invention to provide a suspended axle key mechanism for use in an input device that provides a better feel of touch, a stable depression motion, and which occupies less space inside the input device.

It is another object of the present invention to provide keys for an input device that can be easily assembled.

In order to accomplish the objects of the present invention, the present invention provides a key mechanism for an input device that includes a key having an axle that is coupled to a guide in the housing of the input device in a manner such that the key pivots about the axle when the key is depressed, while allowing the axle to simultaneously move up or down within the guide.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
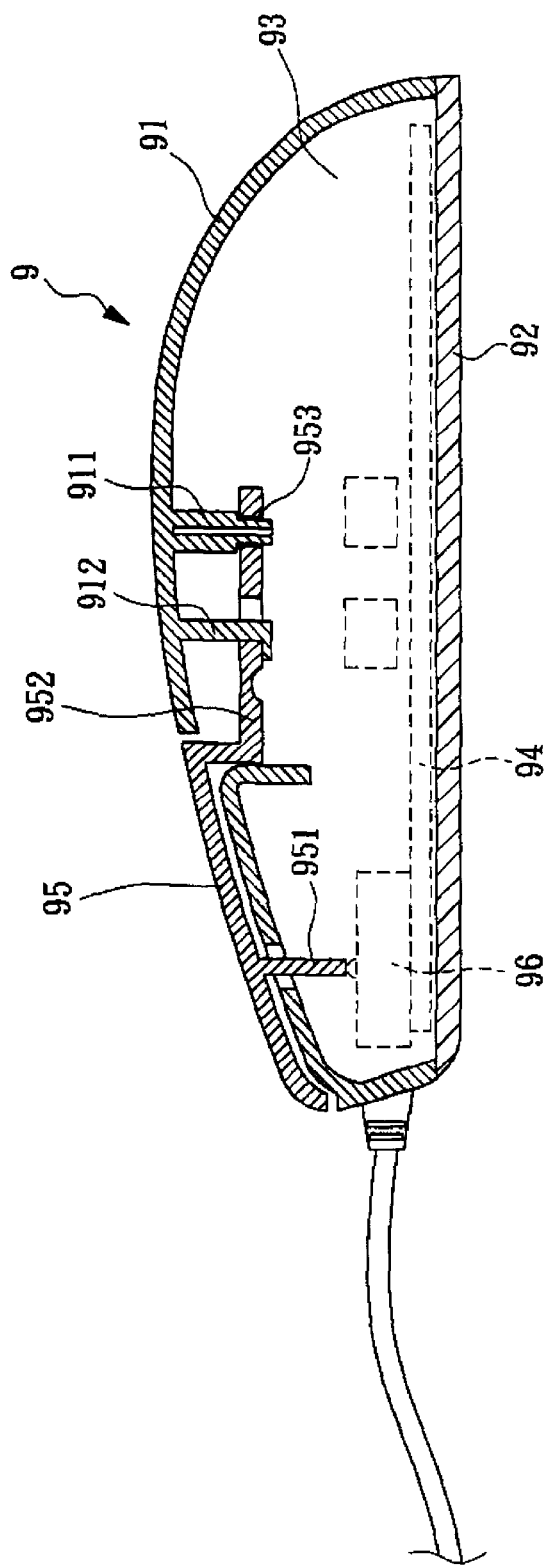
FIG. 1 is a sectional view of a key mechanism of a conventional input device.
Figure 2:
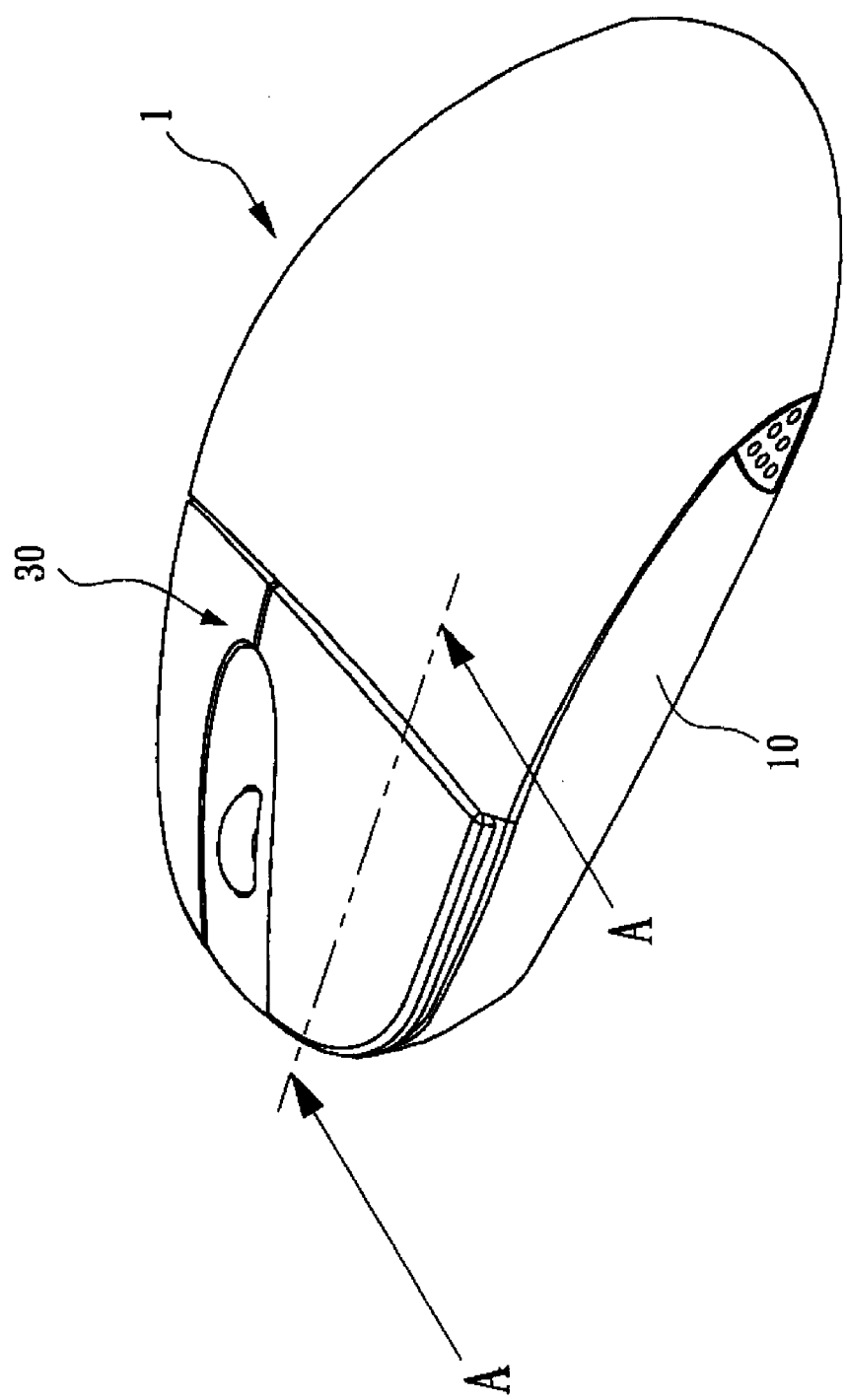
FIG. 2 is a perspective view of an input device according to the present invention.
Figure 3:
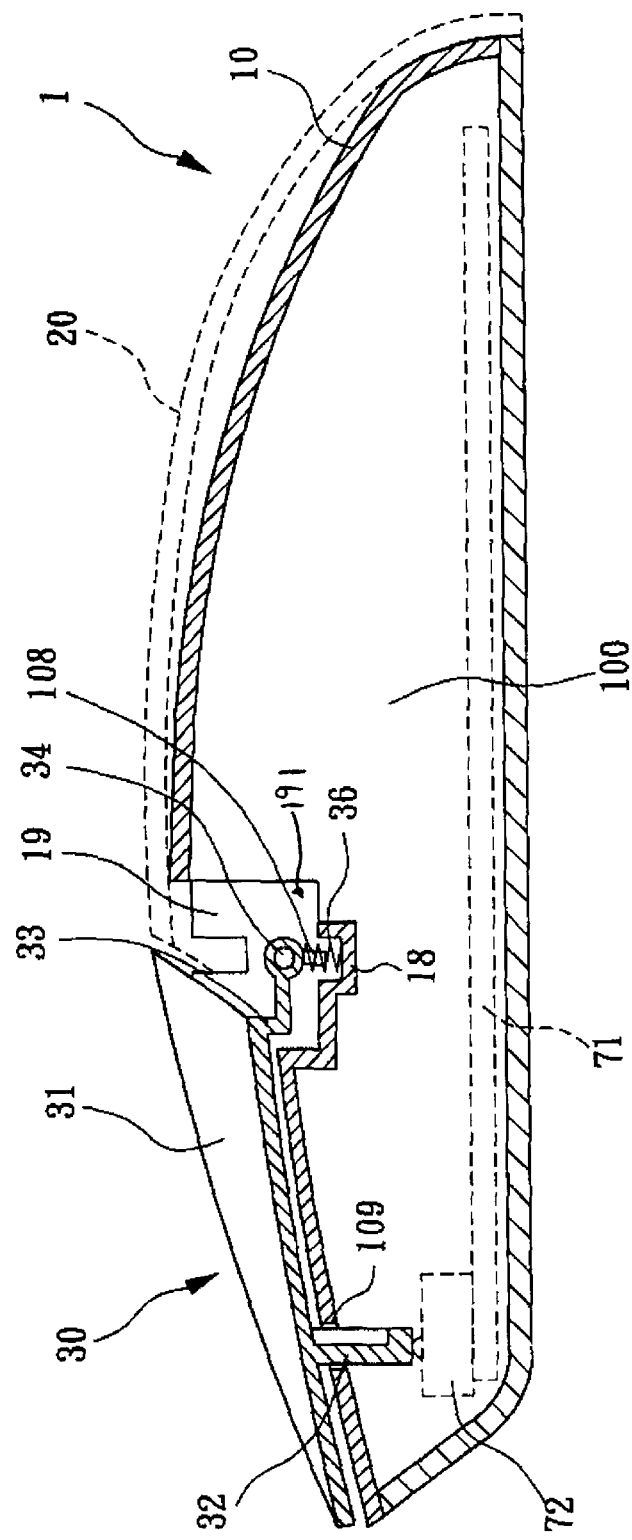
FIG. 3 is a cross-sectional view of the input device of FIG. 2 taken along line A-A thereof.
Figure 4:
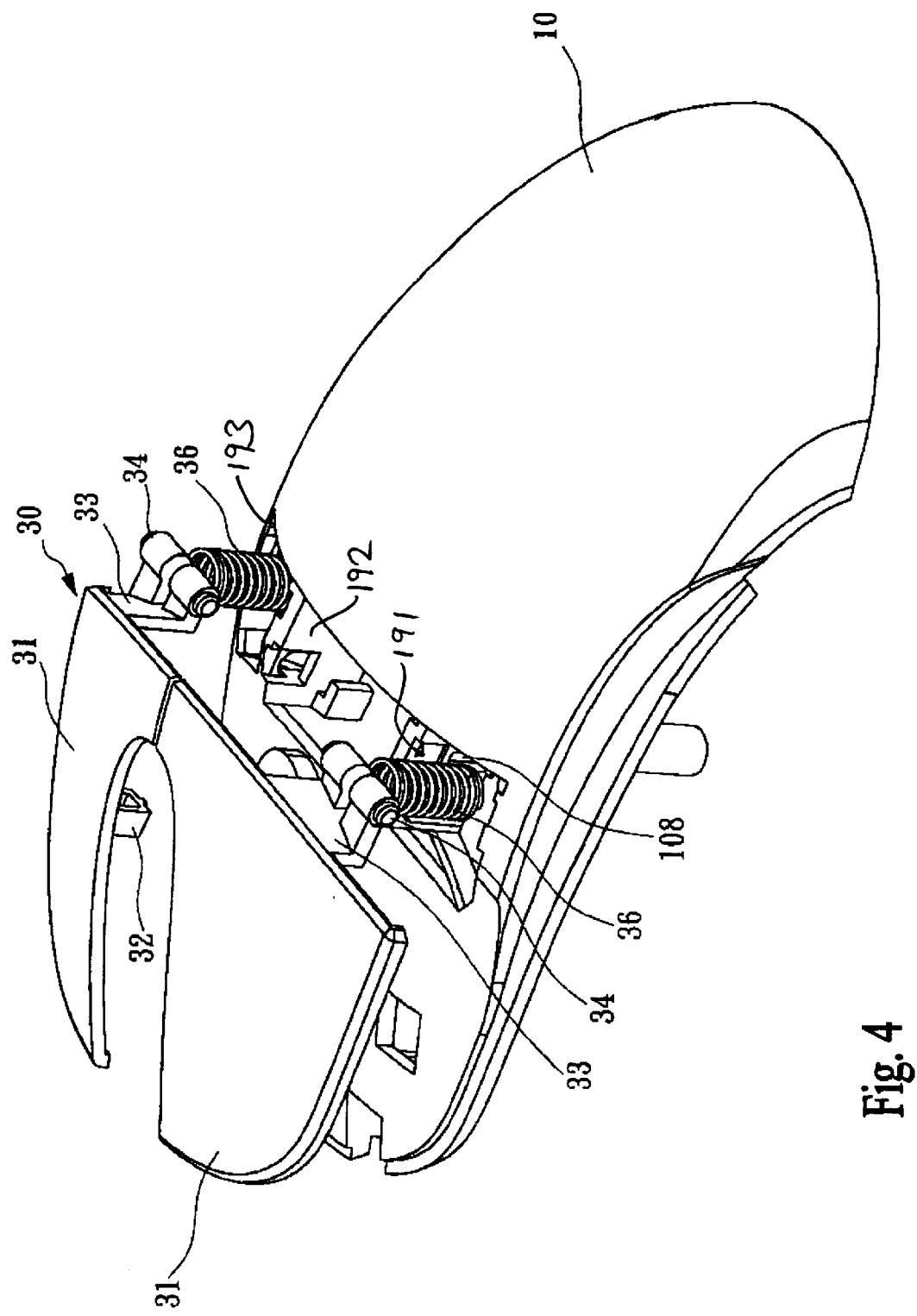
FIG. 4 is an exploded perspective view of the input device of FIG. 2.

FIGS. 2–4 illustrate one preferred embodiment for the present invention, which is embodied in the form of a computer input device 1, which can be an optical computer mouse or a traditional computer mouse that operates with a roller ball. The input device 1 has a main body or housing 10 defining an interior space 100. The input device 1 also has a cover 20, a plurality of keys 30, a plurality of micro switches 72, and a printed circuit board (PCB) 71 that embodies other known and conventional components of an input device (which are not described in any further detail because such components and their operations are well-known in the art). The micro switches 72 can be coupled to the PCB 71, and both the micro switches 72 and the PCB 71 are located inside the space 100. Each of the keys 31 has a protrusion 32 extending down through a corresponding aperture 109 provided on the main body 10. Each protrusion 32 corresponds to one of the micro switches 72. Each protrusion 32 slightly contacts its corresponding micro switch 72, and activates the micro switch 72 when the corresponding key 31 is depressed.

Referring now to FIGS. 3 and 4, each of the keys 31 has a generally L-shaped arm 33 that is connected along an inner end to the key 31, with a suspended axle 34 connected to each arm 33. In one possible embodiment of the present invention, the key 31, the arm 33 and the suspended axle 34 are molded in one piece. At least one opening 19 is provided in the upper surface of the main body 10. Each opening 19 corresponds to one key 31, so that if, for example, two keys 31 are provided, then two corresponding openings 19 will be provided.

At least one well 191 is positioned inside the interior space 100, with each well 191 being accessed by a corresponding opening 19. Each well 191 is defined by at least two opposing walls 192 and 193. A vertical groove 108 is provided in each wall 192 and 193, with each opposing vertical groove 108 in the same well 191 being aligned with each other. A recess 18 is positioned inside each well 191 beneath the grooves 108. During assembly, each arm 33 is fitted into the opening 19 and the axle 34 is pivotally coupled to the opposing groove 108 in the opposing walls 192 and 193 of one of the wells 191. When the axle 34 is pivotally fitted inside the pair of grooves 18, the axle 34 can be moved up and down within the grooves 108. In other words, when each key 31 is depressed, the key 31 is capable of not only turning pivotally about the suspended axle 34, but is also capable of moving up and down inside the opposing grooves 108.

Each suspended axle 34 can be supported by a resilient element 36. The resilient element 36 can be a spiral spring, torque spring, rubber plate spring and the like, and preferably provides a supporting force to the suspended axle 34. According to the present invention, the resilient element 36 is positioned in the recess 18 so as to apply biased support to the downward movement of the suspended axle 34. When no force is applied to the key 31, the resilient element 36 will normally bias the axle 34 upwardly towards the top of the grooves 108.

When the user depresses the key 31 at a location away from the suspended axle 34, the key 31 will turn pivotally about the suspended axle 34. On the other hand, when the user depresses the key 31 at a location near the suspended axle 34, then the key 31 will not only turn pivotally about the suspended axle 34, but will also simultaneously move up or down along the grooves 108. As a result, the user will not feel the rebounding of the key 31 when force is applied to any part of the key 31.

Thus, the present invention omits the necessity of a lengthy extending arm 952, thereby facilitating use in small-sized input devices. This also enables many add-on peripherals and devices to be easily installed inside the input device 1. In addition, such add-on devices can be protected from the contamination of exposure to the ambience by the cover 20 as shown in FIG. 3.

The present invention also overcomes the above-mentioned disadvantages by providing a suspended axle 34 that cushions the rebounding of the keys 31. The construction of the keys 31, and its axles 34, provides numerous benefits in that (i) the construction is simple and inexpensive to manufacture and assemble, and (2) the construction is durable which ensures extended use with minimal deformation.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An input device, comprising:

a housing having a well that is defined by two opposing walls, each wall having a groove that is aligned with the groove in the other wall; and a key having an axle that is coupled to the well in the housing in a manner such the key pivots about the axle when the key is depressed, and the axle can move up and down within the well along the grooves; and a resilient element positioned in the guide and normally biasing the axle in an upward direction;

a micro switch provide inside the housing and activated when the key is depressed.

2. The input device of claim 1, wherein the key further includes an arm that connects the axle with the key.

3. The input device of claim 1, wherein the housing retains an add-on device.

4. The input device of claim 1, wherein the housing further includes a cover.

* * * * *